United States Patent Office 2,908,602
Patented Oct. 13, 1959

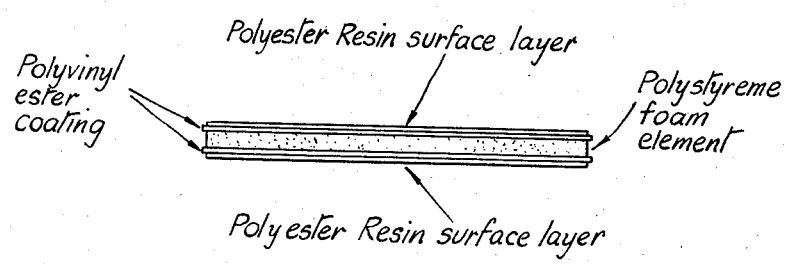

2,908,602

MULTILAYER MATERIALS INCLUDING LAYERS OF MULTICELLULAR SYNTHETIC POLYMER

Georges Collardeau and Claude Tourniaire, Lyon, France, assignors to Societe des Usines Chimiques Rhone-Poulenc, a French body corporate, Paris, France Application October 11, 1957, Serial No. 689,496

Claims priority, application France December 27, 1956

6 Claims. (Cl. 154—128)

The present invention relates to multilayer (i.e. stratified) materials which include in at least one stratum a multicellular synthetic polymer.

It is known to cover multicellular polystyrene materials, socalled polystyrene foam, with polyester resins obtained by copolymerisation of unsaturated polyesters with styrene, the covering layer if desired being reinforced by a fibrous material such as glass fibre. A direct copolymerisation in contact with the polystyrene foam, however, is practically impossible because the monomeric styrene causes the polystyrene foam to swell and may even dissolve it. It has accordingly been proposed to precoat the polystyrene foam with a layer of organic compound sparingly soluble or insolube in styrene and not dissolving polystyrene, this compound having a softening point of from 30° to 100° C. As compounds satisfying this condition, there have been mentioned paraffin and synthetic waxes, which give on melting relatively fluid liquids. Application to the polystyrene foam is effected by dipping the foam sheet in, or painting it with, the molten compound. The polyester resin is thereafter formed by copolymerisation on the polystyrene foam thus covered. However, in the products thus obtained, the adhesion between the polyester resin and the polystyrene foam is weak, especially when the temperature of the product is raised to the melting point of the intermediate wax coating.

It has now been found, and this forms the basis of the present invention, that excellent adhesion of the polyester resins to the polystyrene foam may be obtained, without swelling or dissolution of the latter, if the polystyrene foam is pre-coated with a layer of a polyvinyl compound.

The invention therefore provides a multilayer material comprising a layer of multicellular polystyrene, a layer of a polyvinyl compound adherent to at least one face thereof and a layer of a polyester resin adherent to said layer of polyvinyl compound.

It further provides a multilayer material comprising a layer of multicellular polystyrene, layers of a polyvinyl compound adherent to each face thereof and layers of polyester resin adherent to said layers of polyvinyl compound.

Furthermore the invention provides a process for the production of multilayer material which comprises applying to an element of multicellular polystyrene a surface coat of a polyvinyl compound and thereafter applying a layer of polyester resin to said layer of polyvinyl compound by polymerising the reactants for said polyester resin in situ on the surface of said layer of polyvinyl compound.

The polyvinyl compound employed is preferably polyvinyl acetate, but other polyvinyl derivatives, such as copolymers of vinyl chloride and vinyl acetate, may also be employed.

The polyvinyl compound may be applied either in aqueous emulsion or in solution in a solvent having no action, or substantially no action, on the polystyrene foam. When using polyvinyl acetate a suitable solvent is ethanol.

Aqueous emulsions based on polyvinyl acetate having melting point of 125° C. as determined by the Kramer-Sarnow method are particularly suitable.

The polyvinyl compounds are applied, from emulsion or solution as just indicated, in a thin layer to the polystyrene foam material and the water or the solvents are allowed to evaporate.

Aqueous emulsions of polyvinyl compounds are particularly easy to use since their use does not necessitate the precautions which must always be taken in processes involving the evaporation of an organic solvent. On the other hand, the solutions afford an advantage in terms of a better water impermeability of the coated layer and may thus be preferred when this characteristic is of importance.

After evaporation of the water or of the solvent, the liquid mixture of unsaturated polyester and styrene containing a polymerisation catalyst is applied, if desired in the presence of a fibrous substance, such as a glass fabric, and the mixture is polymerised.

The unsaturated polyester is previously prepared by the methods known per se, by condensation of an unsaturated dicarboxylic acid, e.g. maleic or fumaric acid, with a diol, such as propanediol, if desired in the presence of saturated dicarboxylic acids.

A multilayer material in accordance with the invention, comprising a multicellular polystyrene element having a polyester covering on both sides, is illustrated in the accompanying drawing.

The following example in which the parts are by weight will serve to illustrate the invention:

*Example*

A very thin layer of a mould release agent based on silicone oil is applied to an aluminium plate.

There are then successively deposited on the plate thus treated:

(a) A layer of liquid resin consisting of a mixture of 70 parts of unsaturated polyester (obtained by condensation of an equimolecular mixture of maleic acid and phthalic anhydride with propane-1:2-diol), one part of methylethylketone peroxide (catalyst), 0.01 part of hydroquinone (inhibitor), 0.2 part of cobalt octoate and 30 parts of monomeric styrene, (b) A layer of glass fabric, (c) A further layer of liquid resin as (a), (d) A sheet of polystyrene foam previously coated on its two faces with a layer of an aqueous emulsion of polyvinyl acetate and then dried in the air, (e) A layer of liquid resin as (a), (f) A layer of glass fabric, (g) A further layer of liquid resin as (a) and another plate of aluminium coated with the mould release agent.

A light pressure of the order of 10 g. per cm.² is exerted on the whole assembly. When the polyester resin has hardened, i.e. after about 24 hours at 25° C., the aluminium plates are detached from the assembly of layers (a) to (g). A multilayer panel of polystyrene foam between two layers of polyester resin reinforced with glass fibre is thus obtained, in which the layers are very strongly adherent to one another.

The products of the present invention are of general utility as constructional elements, the covering layers imparting increased rigidity to the multicellular polystyrene and affording a surface resistant to water, chemicals and atmospheric conditions and of good mechanical properties.

We claim:

1. A process for the production of multilayer material which comprises forming on an element of multicellular polystyrene a substantially dry and solvent-free surface coating of a polyvinyl ester selected from the group which consists of polyvinyl acetate and copolymers of vinyl acetate with vinyl chloride, applying to the said coating a mixture of an unsaturated polyester and monomeric styrene and a fibrous material and copolymerising the unsaturated polyester and styrene in situ.

2. Process according to claim 1 which comprises forming the said surface coating by applying to the multicellular polystyrene element an aqueous emulsion of the polyvinyl ester and then removing the water by evaporation.

3. Process according to claim 1 which comprises forming the said surface coating by applying to the multicellular polystyrene a solution of the polyvinyl ester in an organic liquid which is a solvent thereof and a non-solvent for polystyrene, and then removing the said organic liquid by evaporation.

4. Process according to claim 1, wherein the fibrous material comprises glass fibres.

5. A multilayer material comprising a layer of multicellular polystyrene having on at least one face an intermediate layer of a polyvinyl ester selected from the group which consists of polyvinyl acetate and copolymers of vinyl acetate with vinyl chloride, an outer layer of a resinous copolymer of a polyester and monomeric styrene, and embedded in said outer layer a reinforcing fibrous material.

6. Process according to claim 5, wherein the glass fibres are in the form of a fabric.

References Cited in the file of this patent

UNITED STATES PATENTS 2,861,910 Johnson et al.  ---------- Nov. 25, 1958

OTHER REFERENCES

Modern Plastics Encyclopedia Issue, September 1956, vol. 34, 1A, Plastics Catalogue Corp., Bristol, Conn.

Modern Plastics Encyclopedia Issue, September 1957, vol. 35, 1A, Plastics Catalogue Corp., Bristol, Conn.